(12) United States Patent
Rimlinger

(10) Patent No.: US 7,809,498 B2
(45) Date of Patent: Oct. 5, 2010

(54) ONBOARD SYSTEM AND COMPUTER FOR HOLDING DATA UNLOADING IN CASE OF COMPUTER STOPPAGE

(75) Inventor: Remi Rimlinger, Montigny-le-Bretonneux (FR)

(73) Assignee: Renault S.A.S, Boulogne Billancourt (FR)

( * ) Notice: Subject to any disclaimer, the term of this patent is extended or adjusted under 35 U.S.C. 154(b) by 795 days.

(21) Appl. No.: 11/575,438

(22) PCT Filed: Sep. 16, 2005

(86) PCT No.: PCT/FR2005/050753

§ 371 (c)(1),
(2), (4) Date: Mar. 16, 2007

(87) PCT Pub. No.: WO2006/030163

PCT Pub. Date: Mar. 23, 2006

(65) Prior Publication Data

US 2008/0031096 A1 Feb. 7, 2008

(30) Foreign Application Priority Data

Sep. 16, 2004 (FR) .................................. 04 09810

(51) Int. Cl.
*G06F 9/00* (2006.01)
*G06F 11/00* (2006.01)
(52) U.S. Cl. .................. 701/200; 701/35; 717/173; 714/26
(58) Field of Classification Search ............ 701/200, 701/35, 33; 709/230, 232; 717/173, 178; 711/162, 103; 714/26, 34
See application file for complete search history.

(56) References Cited

U.S. PATENT DOCUMENTS

| | | | | |
|---|---|---|---|---|
| 6,396,805 B2 * | 5/2002 | Romrell | ...................... | 370/216 |
| 6,490,616 B1 * | 12/2002 | Maryka et al. | .............. | 709/222 |
| 6,526,447 B1 * | 2/2003 | Giammaria | ................. | 709/232 |
| 6,594,723 B1 | 7/2003 | Champan et al. | | |
| 7,286,908 B2 * | 10/2007 | Hayashi et al. | ................. | 701/1 |
| 7,631,220 B1 * | 12/2009 | Hamilton et al. | .............. | 714/15 |

(Continued)

FOREIGN PATENT DOCUMENTS

EP      1134747      9/2001

(Continued)

OTHER PUBLICATIONS

"Executing a Preemptive, Pririty-based Dispacher in a Multitasking Enviroment", IBM Technical Disclosure Bulletin, vol. 30, No. 4, p. 1542, 1987.

*Primary Examiner*—Tan Q Nguyen
(74) *Attorney, Agent, or Firm*—Oblon, Spivak, McClelland, Maier & Neustadt, L.L.P.

(57) ABSTRACT

A system for data unloading including a computer on board a motor vehicle provided with a memory support whereon data are to be recorded, and a data storage medium, external to the vehicle, from which the data are unloaded. The memory support stores an index, the index being modified during data unloading. In case data unloading from the external storage medium is interrupted, the unloading may be resumed for those data of the external medium identified by the index as not having been recorded on the memory support of the computer. A computer onboard a motor vehicle is designed to be used in such an unloading system.

11 Claims, 3 Drawing Sheets

U.S. PATENT DOCUMENTS

2003/0188303 A1  10/2003  Barman et al.
2004/0064268 A1  4/2004  Gillenwater et al.

FOREIGN PATENT DOCUMENTS

| | | |
|---|---|---|
| EP | 1349405 | 10/2003 |
| JP | 2001265359 | 9/2001 |
| JP | 2002334032 | 11/2002 |
| WO | 0225858 | 3/2002 |

* cited by examiner

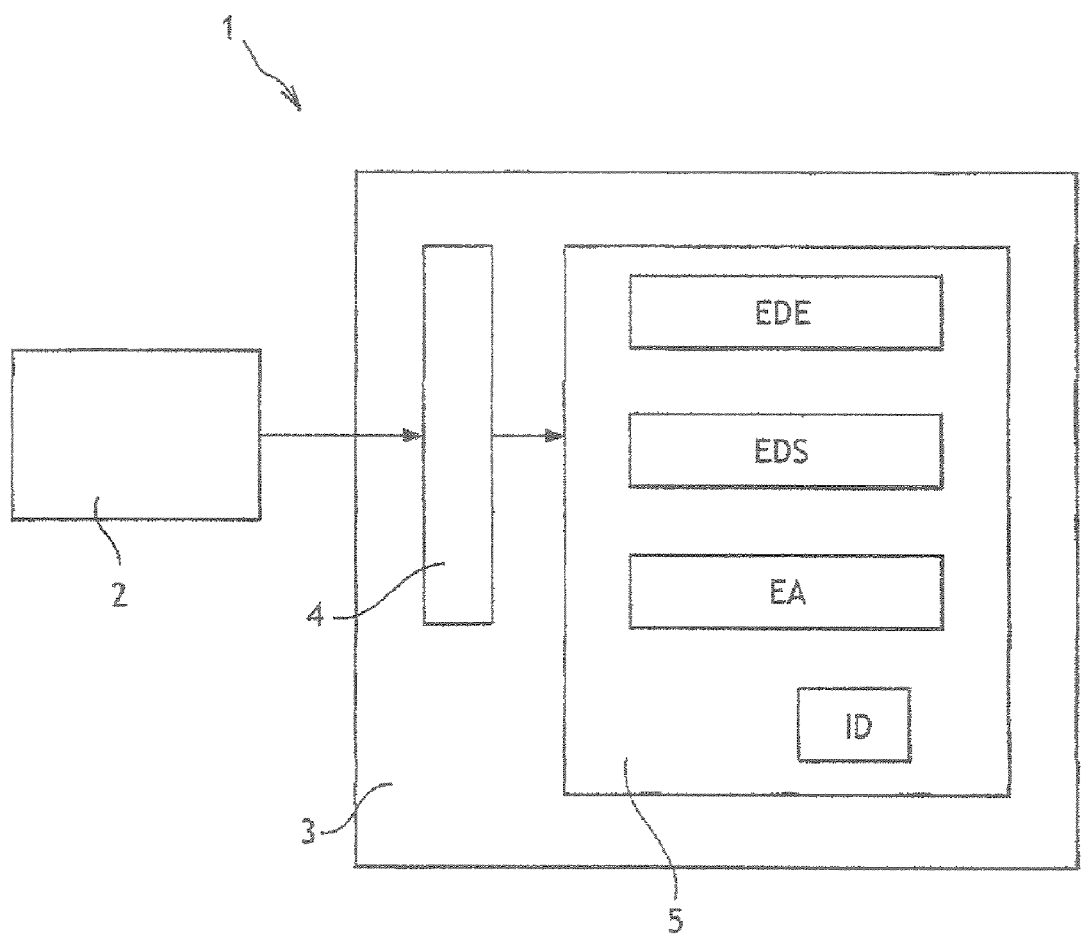

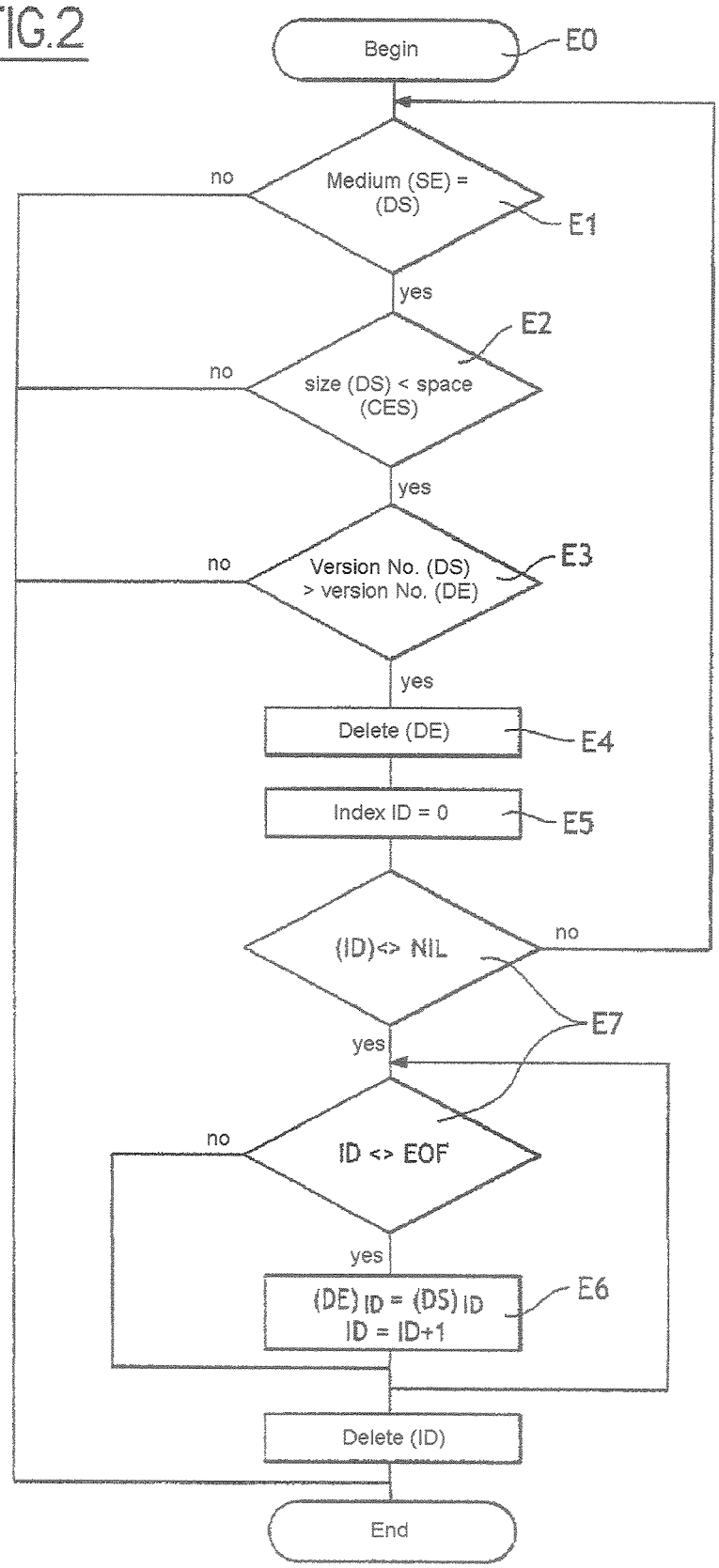

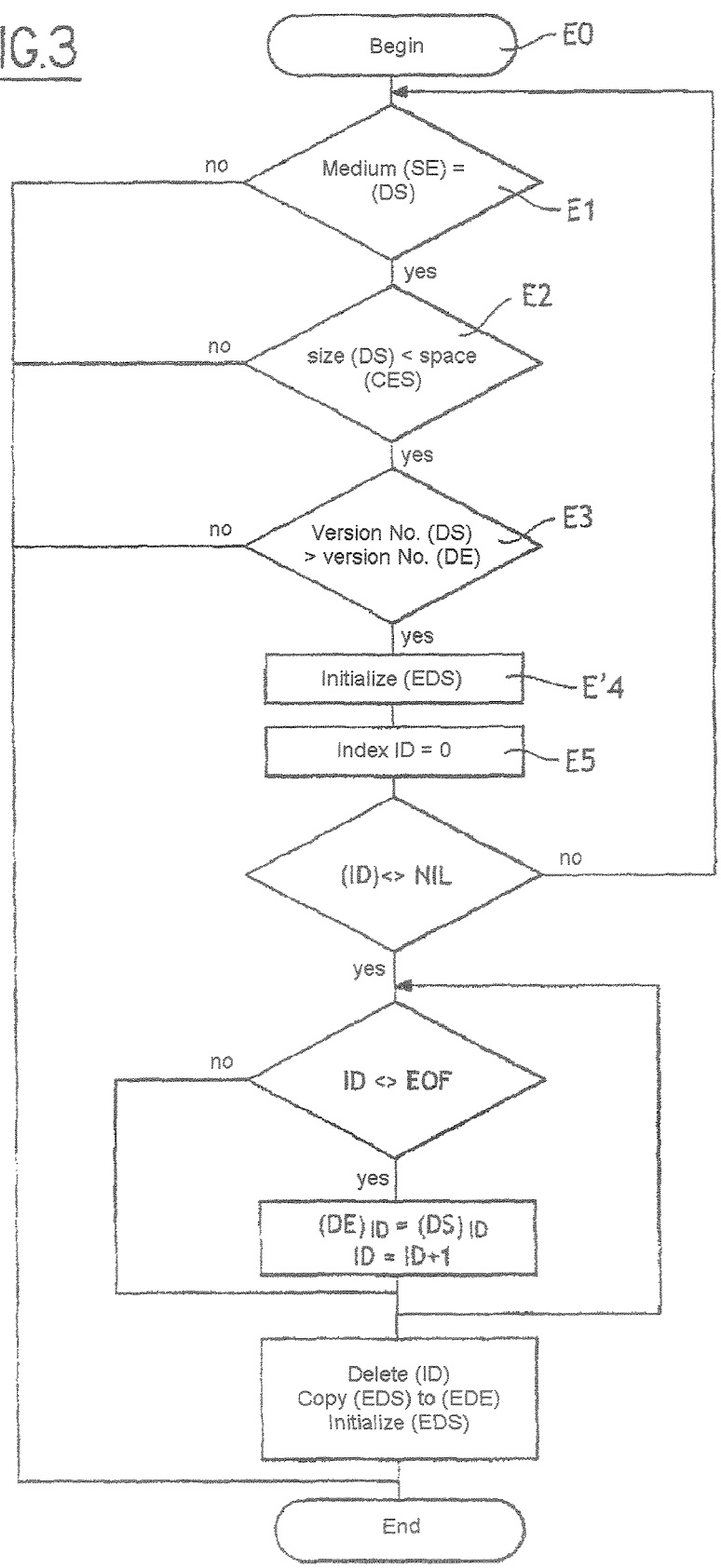

ONBOARD SYSTEM AND COMPUTER FOR HOLDING DATA UNLOADING IN CASE OF COMPUTER STOPPAGE

The invention relates to a system for unloading data comprising a computer onboard a vehicle having available a memory medium on which the data are intended to be recorded, and a data storage medium, external to the vehicle, from which the data are unloaded.

The invention also relates to a computer onboard a motor vehicle, and intended to be used in such a system for unloading data.

The invention advantageously finds application for the recording of a significant quantity of data on a computer onboard a motor vehicle, on the basis of a medium external to the vehicle.

A field of application of the invention is that of the recording and/or the updating of a cartographic database on a computer onboard a motor vehicle.

The use of cartographic data inside a motor vehicle has recently been generalized, in particular on account of the expansion of radiotagging systems, for example the OPS (acronym standing for the expression Global Positioning System) world positioning system.

In order that such a use be possible, the vehicle must have available an onboard computer comprising a memory medium on which the cartographic data are stored.

The cartographic data, for example those relating to zones situated about the current or destination position of the vehicle, are then read and processed by the computer before being displayed to the driver.

The cartographic data are typically stored on a storage medium external to the vehicle, such as a DVD-ROM.

It is then necessary to unload the data stored on the external medium so as to be able to record them on the memory medium of the onboard computer from which they can then be used.

It is mentioned here that such an unloading can relate to the entirety of the files of a cartographic database, or else just the update files for a cartographic database.

However, such an unloading can take place only when the computer is going, that is to say in particular when so also is the vehicle.

However, on account of the significant size of the files to be unloaded from the external medium so as to record them on the onboard computer, the duration of the unloading can turn out significant.

But it may happen that the vehicle, and consequently the embedded computer onboard, is stopped in the course of the unloading. In such a circumstance, the unloading is interrupted and the recording of the cartographic data on the memory medium of the computer is consequently incomplete.

The unloading systems proposed hitherto thus require continuous operation of the computer for the duration of the unloading in order that a complete recording of the cartographic data can be carried out.

These systems are not therefore satisfactory, especially because of the fact that the unloading may be interrupted in the event of stoppage of the vehicle, or else in the event of unexpected stoppage of the computer, and in particular because of the fact that the user of the vehicle is constrained to keep his vehicle going so long as unloading has not terminated.

Document JP 2001 265359 relates to the downloading of musical files onto an audio device embedded onboard a vehicle. This document envisages, in the event of interruption of downloading, that the location corresponding to the stoppage of downloading be stored. Downloading can thereafter be resumed from this stored location.

Document EP 1 134 747 envisages a downloading in the form of data blocks, the blocks presenting chained address fields. Stated otherwise, each block of data presents an index in the form of an address pointing to the following block. In the event of interruption of downloading, the knowledge of the last block downloaded makes it possible to ascertain the next block having to be downloaded and therefore to resume the downloading. This document therefore envisages as many indices as blocks, each index being stored with the associated data, and having available a fixed value (address of the following block) One of the disadvantages of this system is that it is limited to the management of "data blocks" and that it wishes to ensure that the system loads the data properly from the right address.

The invention is aimed at proposing an improved solution for unloading data.

For this purpose, the invention proposes, according to a first aspect, a system for the unloading of data comprising a computer onboard a motor vehicle having available a memory medium on which the data are intended to be recorded, and a data storage medium, external to the vehicle, from which the data are unloaded, the system being characterized in that the memory medium stores an index, said index being modified in the course of the unloading of the data and in that it furthermore comprises means suitable so that in the event of interruption of the unloading of the data from the external storage medium, said unloading can resume for those of the data of the external medium that are identified with the aid of the index as not having yet been recorded on the memory medium of the computer.

One of the advantages of the present invention is that the memory of the computer stores an index permanently, this index being modified in the course of the downloading to make it possible to identify those of the data not yet recorded. The index is stored in a specific space of the memory, and is modified in the course of the downloading.

Therefore, the system comprises means suitable so that the operation for unloading data can circumvent stoppage and startup of the unloading, due to the stoppage and to the startup of the vehicle, in the sense that during a stoppage of the vehicle, the operation stops and during a startup of the vehicle, the operation resumes at the place where it stopped.

Certain preferred, but nonlimiting, aspects of the system according to the first aspect of the invention are the following:

the index is incremented in the course of the unloading so as to represent the quantity of data recorded on the memory medium of the computer and the resumption of the unloading takes place by resuming the unloading of the data from a position, indicated by the index, in the external storage medium;

the stoppage of the computer interrupts the unloading and in that the startup of the computer initiates the unloading or the resumption of the latter;

the system is designed for the recording and/or the updating on the memory medium of the computer, from the external medium, of a cartographic database.

According to a second aspect, the invention proposes a computer onboard a motor vehicle intended to be used in a system according to the first aspect of the invention, characterized in that it comprises a memory medium on which the data unloaded from an external storage medium are intended to be recorded, and on which an index is recorded, the computer modifying said index in the course of the unloading and furthermore comprising means suitable for effecting the unloading from said external medium of solely the data indicated by the index as not having yet been unloaded.

Other aspects, aims and advantages of the invention will appear on reading the following detailed description of preferred embodiments of the latter, given by way of nonlimiting example and offered with reference to the appended drawings, in which:

FIG. 1 is a diagram of a possible embodiment of a system according to the first aspect of the invention;

FIG. 2 is a flowchart illustrating a possible implementation of the invention;

FIG. 3 is a flowchart illustrating another possible implementation of the invention.

Referring now to the drawings, represented in FIG. 1 is a possible embodiment of a system 1 for unloading data according to the first aspect of the invention.

The system 1 comprises a storage medium 2 external to the vehicle on which cartographic data are stored.

The storage medium 2 is for example a DVD-ROM on which are stored one or more files of a cartographic database.

The system 1 also comprises a computer 3 embedded onboard a motor vehicle.

The computer 3 comprises a reading interface 4 and a memory medium 5. The reading interface 4 is suitable for reading the data stored on the external medium 2, and for transmitting the data read to the memory medium 5. The memory medium 5 is thus suitable in particular for receiving and storing the data read by the interface 4.

Within the framework of the example presented here, the reading interface 4 is a DVD-ROM reader.

The memory medium 5 is designed for storing the cartographic data used by the computer, and is in particular suitable for recording the data unloaded from the external medium.

The memory medium 5 comprises more precisely a space EDE reserved for the storage of the data currently being used as well as a space EDS reserved for the storage of new data.

The memory medium 5 also comprises a space EA reserved for the implementation of the unloading according to the invention from the external medium 2 to the memory medium 5 of the computer 3.

It is mentioned that the memory medium 5 can of course also comprise a memory space reserved for applications and data external to the subject matter of the present invention.

The computer 3 comprises means suitable for reading the data on the external medium across its reading interface, recording the data read on the memory medium and, as will be detailed subsequently, creating, updating and deleting an index ID making it possible to identify the data not yet unloaded. This index ID can for example be updated so as to be representative of the quantity of data actually unloaded and recorded on the memory medium 5.

The computer 3 furthermore comprises means suitable, so that in the event of interruption of the unloading of the data, in particular on account of a stoppage of the computer, said unloading can resume, in particular during the restarting of the computer, solely for those of the data of the external medium 2 that have not yet been recorded on the memory medium 5 of the computer 3.

The solution proposed by the invention thus solves the problem of the unexpected stoppage of the computer in the course of the unloading, by proposing the resumption of the unloading, after restarting of the computer, solely as regards data not yet recorded.

The recording of data on the computer from the external medium is therefore no longer subject to the stoppage or to the multiple stoppages of the computer; the unloading is thus only suspended during a stoppage of the computer.

The unloading thus takes place in a manner transparent to the user, who in particular is no longer compelled to keep his vehicle going so long as the unloading is not accomplished in its entirety.

In order to permit such a "suspending" of the unloading, an index ID, recorded on the memory medium 5, is modified in the course of the unloading, and used so as to determine, in the event of stoppage of the computer and of interruption of the unloading, those of the data which have not yet been recorded on the medium of the computer.

The index ID can in particular be incremented in the course of the unloading to represent the quantity of data actually unloaded and recorded on the memory medium 5 of the computer 3. In this way, in the event of suspension of the unloading, the index ID makes it possible to indicate a position in memory of the external medium 2 from which the unloading should resume.

According to a first particular embodiment of the invention, the space allocated to the memory medium 5 of the computer 3 is limited, and can host only a single cartographic database at a time. The whole set of cartographic data stored on the external medium is then used so as to be recorded in the space EDE. The size necessary for storing the whole of a cartographic database unloaded from the external medium is then allocated to the space EDE.

According to a second particular embodiment, the computer uses the data recorded in the space EDE as well as update data that one comes to record in the space EDS by unloading them from the external medium. The size necessary for storing the update data unloaded from the external medium is then allocated to the space EDS.

The description hereafter, given with reference respectively to FIGS. 2 and 3, is aimed at the presentation of the two particular embodiments mentioned above.

The flowchart of FIG. 2 illustrates the various steps of the first embodiment according to which the memory medium of the computer can store only one cartographic database at a time, this base being deleted during the unloading of a more recent base from the external medium.

Following the startup of the computer during the step referenced E0 in FIG. 2, the latter polls in the course of a first step E1 by way of its reading interface 4 the type of files stored on the external medium 2.

If the external medium 2 (SE) does not have available files of a cartographic database (DS), the computer 3 does not place itself in record or update condition. The unloading of the data therefore does not take place.

On the other hand, if the external medium SE has available a cartographic database DS, the size of the database DS available on the external medium SE is compared, in the course of the following step E2, with the space allocated to the memory medium 5 (CES) of the computer 3 (CE).

If the size of the database DS on the external medium SE is greater than the space allocated on the memory medium CES of the computer, the unloading is not done.

On the other hand, if the size of the database DS on the external medium SE is greater than the space allocated on the memory medium CES of the computer, the computer verifies, in the course of a third step E3, whether it already possesses a version of the cartographic database (DE) on its memory medium CES.

If such is the case, the computer compares the version number of the cartographic database DE stored on its memory medium with that of the database DS available on the external medium.

If the base DE is the most recent, the unloading is not carried out.

If on the other hand the base DS is the most recent, the base DE (older), is deleted in the course of a fourth step E4.

The computer then allocates to the space EDE of the recorded data the size of the database DS called on to be unloaded onto EDE. This allocation is also carried out when no version is yet stored on the memory medium of the computer, the version available on the external medium being called on to be unloaded thereto.

Moreover, the computer initializes the space EDE with a file filled with zero values and an end-of-files pointer EOF corresponding to the size of the database DS.

In the course of a fifth step E5, the computer creates the index ID and initializes it to the value 0. The index ID will subsequently be incremented after each unloading of a data packet from the external medium SE to the memory medium CES of the computer CE. The data packet corresponds to a predetermined quantity of data, for example 1 kilobyte.

In the course of a sixth step E6, the computer begins the unloading of the data by way of its reading interface; the reading on the external medium SE being performed on the basis of the data packet at the position indicated by the index ID.

The computer stores on its memory medium the data packet corresponding to the position ID. The index ID is then incremented to the higher value (ID+1). The computer accesses the following data packet on the external medium, doing so as long as the value of the index ID is different from that of the pointer EOF, that is to say so long as the unloading of the entirety of the geographical database is not completed.

However, in the case where the computer is stopped before the complete unloading of the database of the external medium onto the memory medium of the computer, the computer verifies (step E7), during its restart, the existence of the index ID.

If the index ID is not created (ID=NIL), the computer loops back to step E1 discussed previously.

On the other hand, if the index ID exists (ID< >NIL), the computer continues the unloading, suspended during its stoppage, by operating as indicated previously in step E6.

When the unloading is completed, the computer deletes the index ID.

The flowchart of FIG. 2 illustrates the various steps of the other embodiment discussed previously according to which the computer uses the data recorded in the space EDE as well as update data that one comes to record in the space EDS by unloading them from the external medium.

Steps E0, E1, E2 and E3 are similar to those set forth previously.

The fourth step E'4 relates to the allocation to the space EDS of the new data of the memory medium of the computer of the size of the data DS which are called on to be unloaded thereto.

The fifth step is identical to step E5 mentioned previously.

The unloading of the data is done in a manner similar to what was presented during step E6 except that the data o the external medium are in this circumstance unloaded onto the space EDS.

In particular, in the event of stoppage of the computer, the unloading is only suspended in that it will be able to continue, upon the resumption of the computer, with the aid of the index ID, from exactly where it was interrupted.

When the unloading is completed, the computer deletes the index ID, copies the data of EDS onto EDE, and reinitializes the space EDS.

The computer 3 uses the mechanisms of read and write access to the memory medium 5 of the computer 3. The memory medium 5 has available inherent resources for placing the data on standby awaiting use by virtue of the buffer mechanisms. This placing on standby of the data to be loaded onto the memory medium 5 permits the computer to access the memory medium 5 to use other data present on the memory medium 5, such as the older version cartographic database already present or other data not related to the cartographic database, or to load other data. Thus, the system comprises means suitable for permanent use of the system by the user, even during the data unloading operation which is transparent to the user, the older version data already being present on the memory medium of the system and therefore accessible by the user.

The computer 3 of the vehicle has available all the means for the loading of the data onto the memory medium 5, the reading interface 4 being integrated with the computer 3, the only item of equipment outside the computer necessary for carrying out the loading of the data onto the memory medium 5 being the external storage medium 2. This loading can thus be carried out while driving or when stationary without requiring resources external to the computer 3 apart from the external storage medium 2 which is portable by the user. Thus, the system comprises means suitable so that the unloading opera ion can be done equally well while driving as when stationary.

The data of the external storage medium 2 are available or use by the user and are so even during their loading onto the memory medium 5. The computer 3 uses the resources of its processor allowing the execution of several applications simultaneously. The external data 2 being at the same time used for the guidance application of the computer 3 and loaded onto the memory medium 5. Thus, the system comprises means suitable so that the request for access by the user to the older version data already present on the memory medium of the system is taken into account by the data unloading operation mechanism in the sense that the latter will limit the data unloading throughput so as to be able to meet the user's request.

The computer 3 verifies the oldness of the cartographic database stored on the memory medium 5 with respect to that stored on the external medium 2 by the mechanism of comparison of the versions and of the cartographic database datestamps which is integrated with the computer 3. The loading is not performed if the cartographic database already stored on the memory medium 5 is posterior to that of the external medium 2. Thus, the system comprises means suitable for being certain of the oldness of the version of the data already present in the system with respect to the version of the data to be unloaded.

Finally, the computer 3 has available means of recognition of reliability of the data of the external medium 2. The computer 3 initializes the loading of the data after the startup of the data reliability monitoring application implementing the reading of the encrypted signature of the provider of the data of the external medium 2 known by the computer 3. Thus, the system comprises means suitable for being certain of the reliability of the data to be unloaded in the system by various security means. These means being able to be a signature of the product by the provider of the data, plus protection against the possibility of illegal copying.

The invention claimed is:

1. A system for downloading of data comprising:
   a computer onboard a motor vehicle having available a memory medium on which the data can be recorded, and
   a data storage medium, external to the vehicle, from which the data are downloaded from, wherein the memory medium stores an index, the index being modified in the course of the downloading of the data; and an interruption unit configured to, in the event of interruption of the downloading of the data from the external storage medium, resume downloading for those of the data of the external medium that are identified with aid of the index as not having yet been recorded on the memory medium of the computer, wherein the computer uses mechanisms of read and write access to the memory medium to access other data of the memory medium during loading of a new database, the memory medium having available inherent resources for placing the data on standby awaiting use by virtue of buffer mechanisms, the placing on standby of the data to be loaded onto the memory medium permitting the computer to access the memory medium to use other data present on the memory medium, or to load other data.

2. The system as claimed in claim 1, wherein the index is incremented in the course of the downloading so as to represent a quantity of data recorded on the memory medium of the computer, and resumption of the downloading takes place by resuming the downloading of the data from a position, indicated by the index, in the external storage medium.

3. The system as claimed in claim 1, wherein stoppage of the computer interrupts the downloading and startup of the computer initiates the downloading or resumption of the downloading.

4. The system as claimed in claim 1, configured for recording and/or updating, from the external medium, of a cartographic database to be stored on the memory medium of the computer.

5. The system as claimed in claim 1, wherein the computer includes a loading unit configured to load the data onto the memory medium, a reading interface being integrated with the computer, the only item of equipment outside the computer necessary for carrying out the loading of the data onto the memory medium being the external storage medium such that the loading can be carried out while driving or when stationary without requiring resources external to the computer apart from the external storage medium which is portable by a user.

6. The system as claimed in claim 1, wherein the data of the external storage medium are available for use by a user even during their loading onto the memory medium, the computer using resources of its processor allowing execution of plural applications simultaneously and the external data being at a same time used for guidance application of the computer and loaded onto the memory medium.

7. The system as claimed in claim 1, wherein the computer verifies age of a cartographic database stored on the memory medium with respect to that stored on the external medium by a mechanism of comparison of versions and of the cartographic database date-stamps which are integrated with the computer, the loading not being performed if the cartographic database already stored on the memory medium is posterior to that of the external medium.

8. The system as claimed in claim 1, wherein the computer includes a reliability unit configured to recognize reliability of the data of the external medium, the computer initializing loading of the data after startup of an application of monitoring of reliability of the data implementing reading of an encrypted signature of a provider of the data of the external medium known by the computer.

9. A computer onboard a motor vehicle configured to be used in a system as claimed in claim 1, comprising:
   a memory medium on which the data downloaded from an external storage medium can be recorded and on which an index is recorded, the computer modifying the index in the course of the downloading; and
   a downloading unit configured to download from the external medium solely the data indicated by the index as not having been downloaded yet.

10. The computer as claimed in claim 9, further comprising an incrementing unit configured to increment the index in the course of the downloading so as to represent a quantity of data recorded on the memory medium and resume the downloading only from a position, indicated by the index, in the external medium.

11. The computer as claimed in claim 9, further comprising:
   a reading interface configured to read the data from the external medium and to transmit the read data to the memory medium for recording.

* * * * *